United States Patent [19]
Robertson

[11] Patent Number: 5,720,127
[45] Date of Patent: Feb. 24, 1998

[54] CONTACT CHEMICAL APPLICATOR DEVICE AND METHOD

[76] Inventor: Timothy J. Robertson, "Teangi", Wollomombi, Armidale New South Wales, Australia, 2350

[21] Appl. No.: 350,314

[22] Filed: Dec. 1, 1994

Related U.S. Application Data

[63] Continuation of PCT/AU93/00257, Jun. 1, 1993 published as WO93/23996, Dec. 9, 1993.

[51] Int. Cl.$^6$ ............................................. B05B 1/20
[52] U.S. Cl. ........................... 47/1.5; 239/169; 239/166
[58] Field of Search .................. 47/1.01, 1.5; 111/73, 111/52, 173, 187; 172/311, 456, 624.5; 239/167, 166, 169, 172

[56] References Cited

U.S. PATENT DOCUMENTS

| | | | |
|---|---|---|---|
| 3,874,593 | 4/1975 | Wilt . | |
| 4,039,147 | 8/1977 | Hugg . | |
| 4,350,294 | 9/1982 | Gaspard . | |
| 4,562,779 | 1/1986 | Briggs | 111/173 |
| 4,664,202 | 5/1987 | Applequist et al. | 172/311 |
| 4,715,302 | 12/1987 | Briggs | 111/173 |
| 4,817,729 | 4/1989 | McCormick | 172/311 |
| 5,062,489 | 11/1991 | Adee | 172/311 |
| 5,178,328 | 1/1993 | Broyhill | 172/311 X |

FOREIGN PATENT DOCUMENTS 1 375 039   11/1974   United Kingdom .

OTHER PUBLICATIONS

Derwent Abstract Accession No. 087480/14, Class P14, SU, A., 1,025,389 (Agric Management) 30 Jun. 1993 (30.06.83) See Figure.

*Primary Examiner*—Henry E. Raduazo
*Assistant Examiner*—Robert Pezzuto
*Attorney, Agent, or Firm*—Darby & Darby

[57] ABSTRACT

This invention provides a contact chemical applicator for distributing liquid chemicals to foliage. Each applicator is comprised of a substantially elongated and downwardly disposed body with a ground contact means at a lower end of the body which makes contact with the ground as the applicator is moved in a direction of travel. The applicator has a pair of applicator arms that extend substantially outward at opposed angles transverse to the body and are positioned in a line or in a V-shaped configuration. In use, each arm contacts the foliage and/or the ground and thereby supplies the liquid chemical. A preferred embodiment utilizes a plurality of applicators arranged in rows to form a distributed device such that foliage contacted by an arm of an applicator in a forward row becomes deflected sideways in an opposite direction to that in which it is deflected by an arm of an applicator in a rearward

23 Claims, 6 Drawing Sheets

CONTACT CHEMICAL APPLICATOR DEVICE AND METHOD

This is a continuation of international application Ser. No. PCT/AU93/00257, filed Jun. 1, 1992 published as WO93/23996, Dec. 9, 1993.

The present invention relates to a contact chemical applicator device and a method for distributing a liquid chemical to foliage and/or a substrate surface.

Many different types of chemical applicators are presently known, for distributing chemicals such as weedicides, herbicides, fertiliser, etc. to foliage.

The most common types of chemical applicator presently utilised, are various spray devices. These devices have the disadvantage that excess spray may be carried away by the wind which then contacts and damages plants or growth in other areas. Such sprays are also harmful to human beings and animals, if inhaled or contacted.

Also used are "rope wick" applicators, which utilise nylon rope as a wick therefor, and which is contacted with foliage to apply liquid chemical to the foliage.

The third type of chemical distribution device, is the roller-type applicator, which utilises an absorbent material covering an elongated member, which is moved over or rolled over a ground surface such that foliage is contacted by the absorbent material which covers the applicator. Such roller applicators are disclosed in previous Patent specifications including AU-A-75425/91, AU-A-79126/91, AU-A-77759/87 and AU-A-70598/90.

Whilst prior art "contact" applicators, that is, the roller applicators or rope wick applicators, have certain advantages over "spraying" devices, all these presently known applicators have a common disadvantage, in that not all foliage which is intended to be contacted by the applicators, is in fact contacted.

The prior art contact applicators, contact the foliage, and bend the foliage as the applicator is passed thereover. During such bending action, however, much of the foliage is uncontacted by the applicator since it is bent by foliage upstream in the transport direction as the applicator is moved through the foliage.

The present invention seeks to provide a contact chemical applicator for distributing a liquid chemical to foliage and/or a substrate surface, which enables a higher amount of contact of the foliage by the distributor device, to ensure a more thorough application of the liquid chemical.

In one broad form, the present invention provides a contact chemical applicator, for distributing a liquid chemical to foliage and/or a substrate surface, comprising:

a substantially elongate and downwardly disposed body portion;

ground contact means at a lower end of said body portion, to contact said substrate surface as said applicator is moved in a direction of travel; and, a pair of applicator arms, extending substantially outwardly at opposed angles, transverse to both said body portion and said direction of travel, each arm contacting and thereby supplying said liquid chemical to said foliage and/or said substrate surface.

The arms preferably extend either in line, or in a substantially V-shaped configuration, or any angle therebetween.

Preferably, said ground contact means is at least one skid or wheel.

Also preferably, said body portion is connected to a handle means or a frame.

In this form of the invention, preferably a flexible connecting piece and/or a spring means is provided along said body portion, intermediate, said handle means or frame, and, said ground contact means.

Preferably each applicator arm is connected to said body portion via a flexible connection and/or spring means.

Also, preferably each said arm is variable in angular disposition relative to the direction of travel and/or its inclination to said substrate surface.

In a preferred form a secondary ground contact means is provided at the end of each arm, to provide additional support to said applicator.

A preferred implementation is wherein said liquid chemical is supplied to each arm via supply means internal to said body portion.

In this form, preferably the rate of supply of the liquid chemical is controlled by a moisture sensing means provided on at lest one arm.

In a further broad form, the present invention provides a distribution device, comprising a plurality of contact chemical applicators as hereinbefore defined, the applicators being provided in a single row substantially normal to the direction of travel.

In another broad form, the present invention also provides a chemical distributor, comprising a plurality of contact chemical applicators as hereinbefore described, said applicators being provided in a plurality of rows substantially normal to the direction of travel, the applicator(s) in alternate row(s) being positioned substantially intermediate the applicator(s) in adjacent row(s) relative to the direction of travel, such that, in use, foliage contacted by an arm of an applicator in a first row is deflected in a substantially opposite sideways direction to that in which it is deflected by an arm of an applicator is a second row.

In this latter form, preferably the applicator(s) in alternate rows are positioned at different heights from said ground surface to the applicator(s) in adjacent rows, such that, in use, foliage contacted by an applicator(s) in a front row is deflected in a vertical direction relative to that in which it is deflected by arm(s) of an applicator(s) in a second row.

The present invention will become more fully understood from the following detailed description of a preferred but non-limiting embodiment thereof in connection with the accompanying drawings wherein.

Throughout the description and drawings, like numeral will be used to identify similar features, except where expressly indicated.

Figure 1:
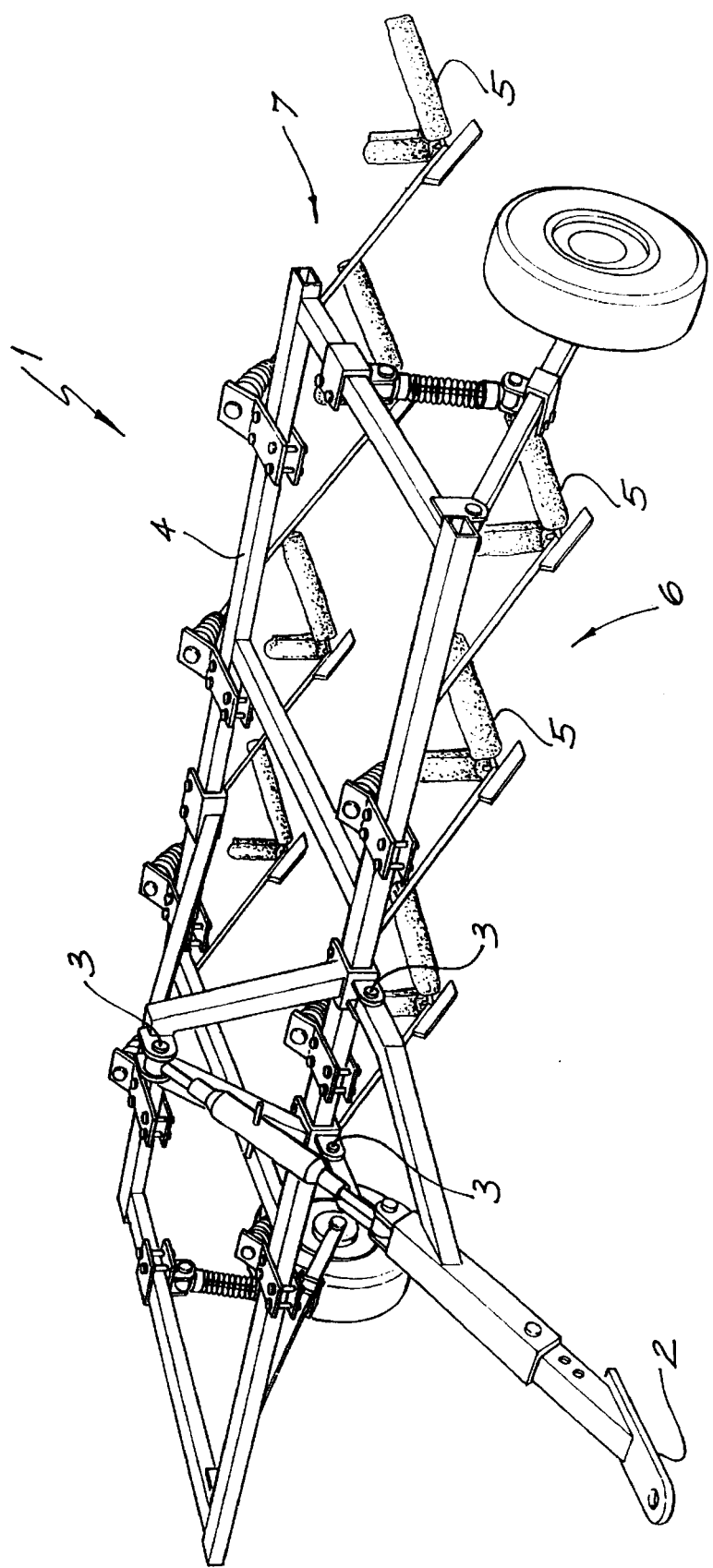
FIG. 1 illustrates a chemical distributor dence in accordance with the present invention which may be attached to the back of a vehicle.
Figure 2:
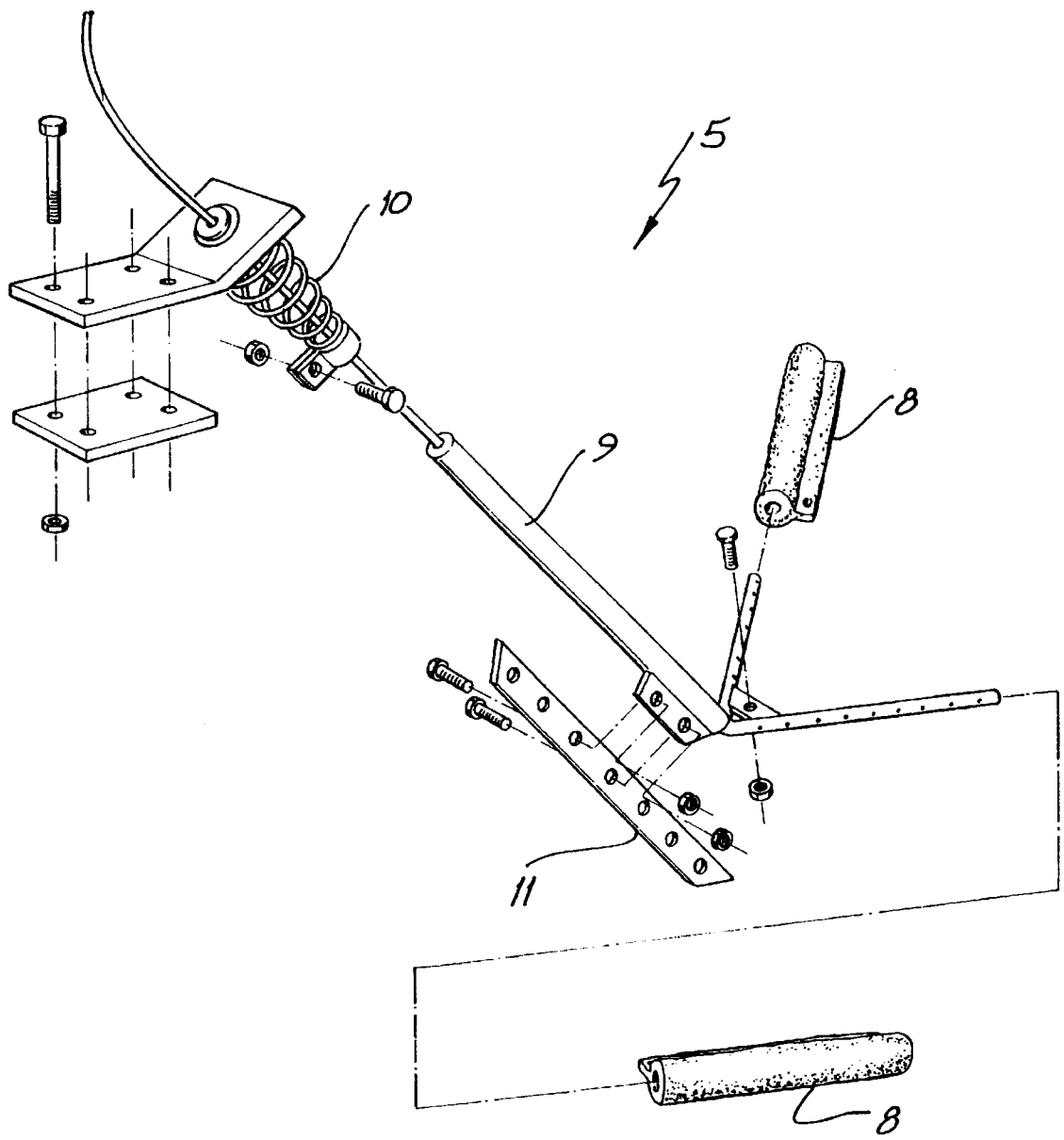
FIG. 2 illustrates a contact chemical applicator of the present invention.
Figure 3:
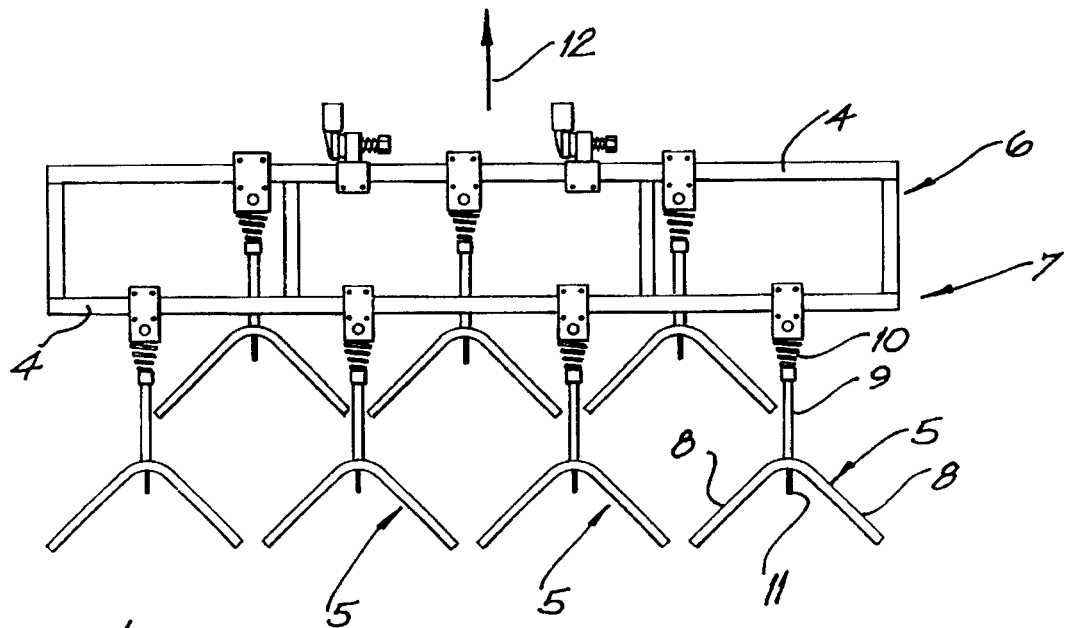
FIG. 3 illustrates a plan view of the distributor as shown in FIG. 1.
Figure 4:
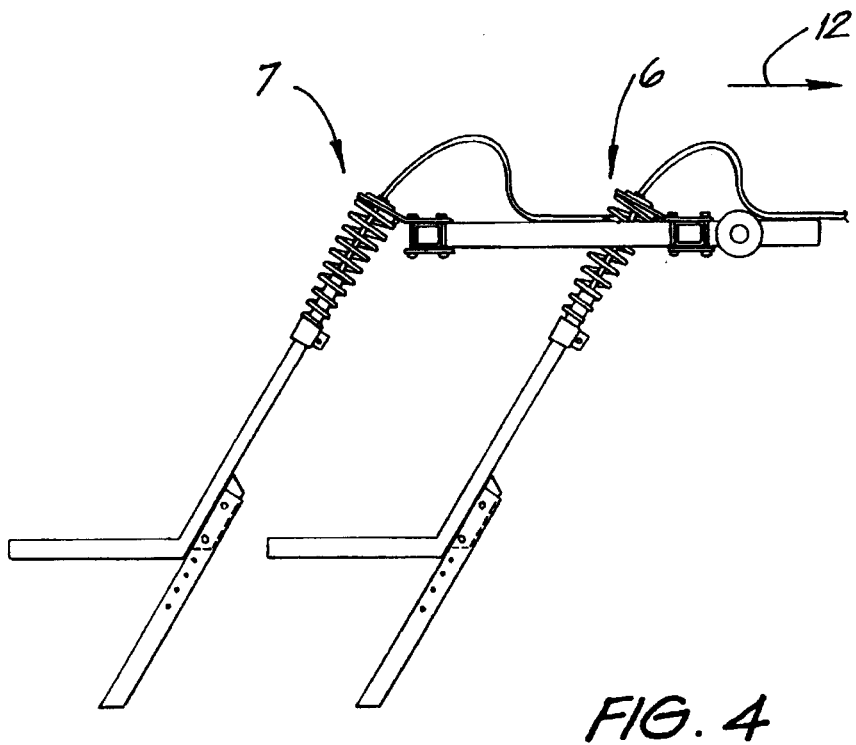
FIG. 4 shows an elevational view of the distributor of FIGS. 1 and 3.
Figure 5:
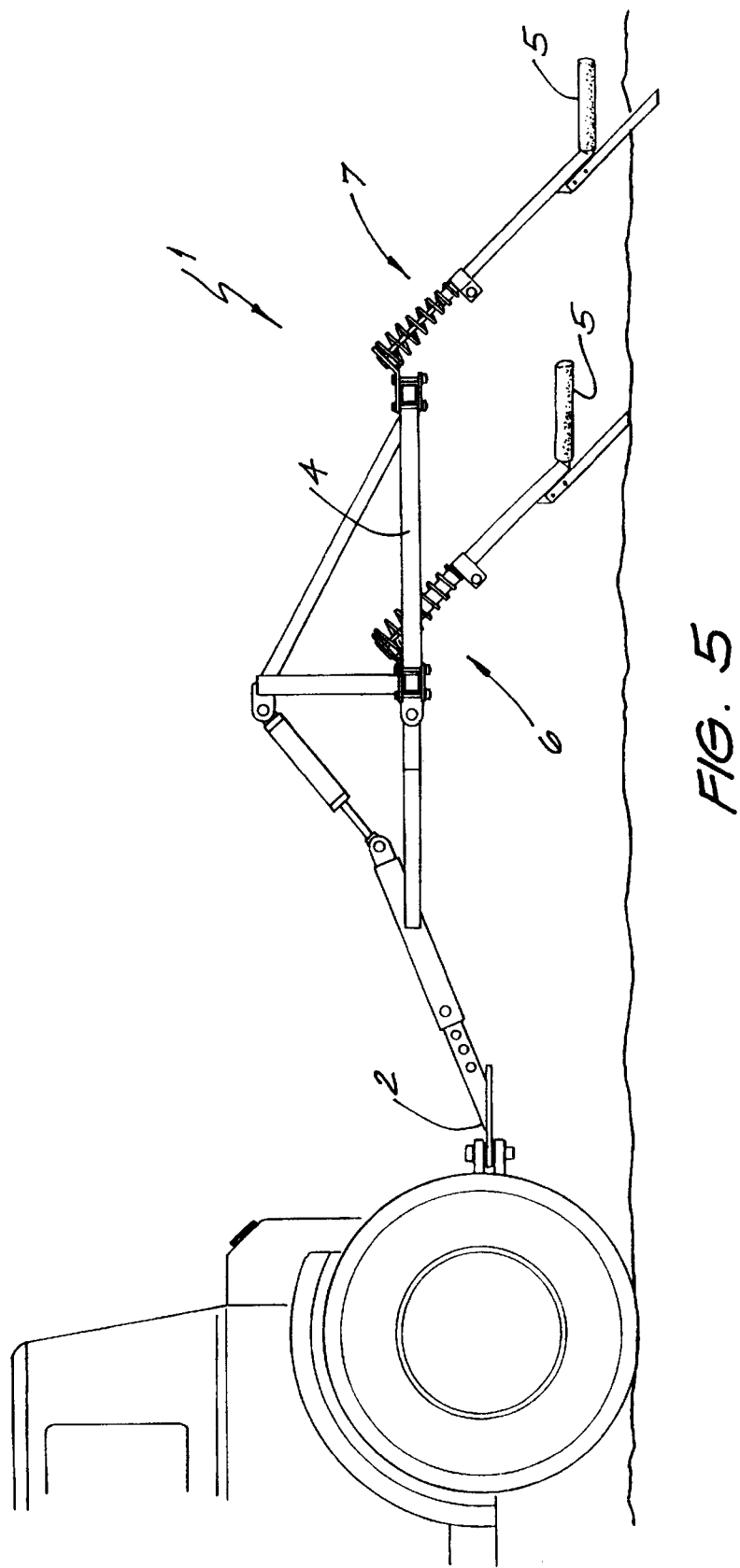
FIG. 5 illustrates a similar device to that of FIG. 4, but having the arms set at different heights.
Figure 6:
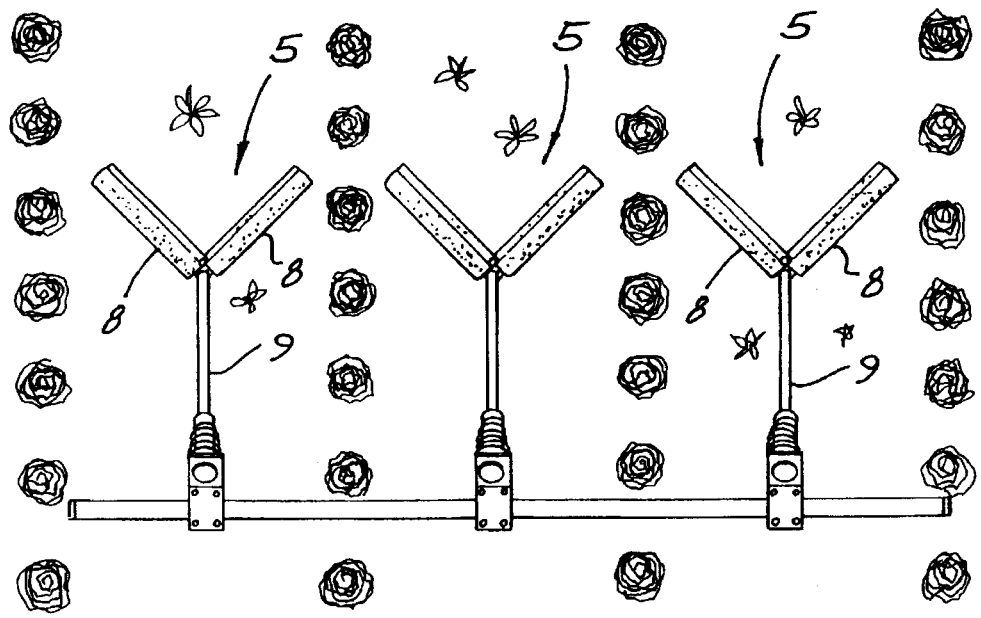
FIG. 6 shows an alternative embodiment, having applicators in a single row.

The distributor, generally designated by the numeral 1, may be attached to the back of a vehicle view a towing device 2. Preferably, a swivel mount connection is provided wherein, when not in use, the distributor may be pivoted out of the operational position by mounting pins 3. The distributor comprises a frame 4 having a plurality of applicators 5 attached thereto. The applicators are of the type having an elongate body with a covering of absorbent material, wetted with a liquid chemical. This may be embodied utilising conventional techniques, such as providing a hollow body having end closures for containing a liquid chemical thereon, the elongate body having a plurality of openings therethrough to allow the egress of the liquid chemical through the openings. The exterior of the elongate body is then provided with an absorbent material, such as carpet-like material therearound, which absorbs the liquid chemical emitted through the holes. The absorbent material is therefore wetted with the liquid chemical, such that when foliage is contacted by the absorbent material, the liquid chemical is applied to the foliage. As illustrated in the drawings, the applicators may be provided in a plurality of rows, relative to the direction of travel. The rows are illustrated by the numerals 6 and 7.

The drawings illustrate that each applicator 5 is comprised of a pair of applicator devices or elongate bodies 8 extending from a central support member 9 which support member is attached to the frame 4, preferably, but not essentially, by a resilient connection 10. The arms 8 may extend either substantially in line, in a substantially V-shape configuration, or at any angle therebetween. Preferably, each arm is at opposed angles. The provision of the resilient connection 10 enables the device to travel over all types of terrain, smooth or rough, without effecting the operation thereof. Optionally, additional flexible connections or spring means may be provided between each arm 8 and its support member 9. Preferably, the support member 9 is also provided with a ground contact means 11 at the lower end thereof, which is adapted to travel over a substrate surface. The ground contact means may be optionally connected to the support member 9 by a flexible connection or spring means.

If one of the applicators 8 therefore comes into contact with an obstacle such as a boulder, the resilient connections enable the applicator to ride over the boulder without causing damage to the particular applicator or the remainder of the distribution device.

Figure 7:
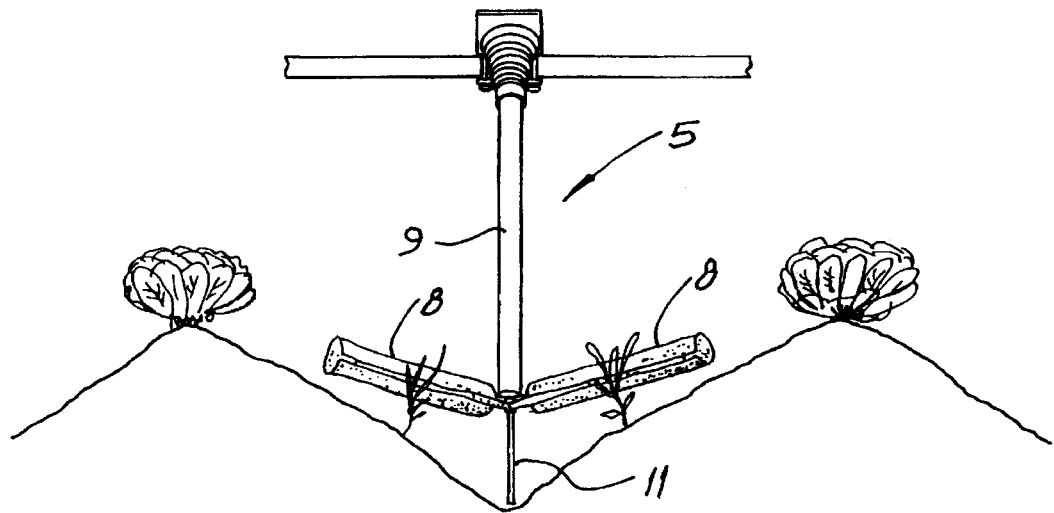
FIG. 7 shows a front/rear view of one applicator of the of FIG. 6, in use.
Figure 8:
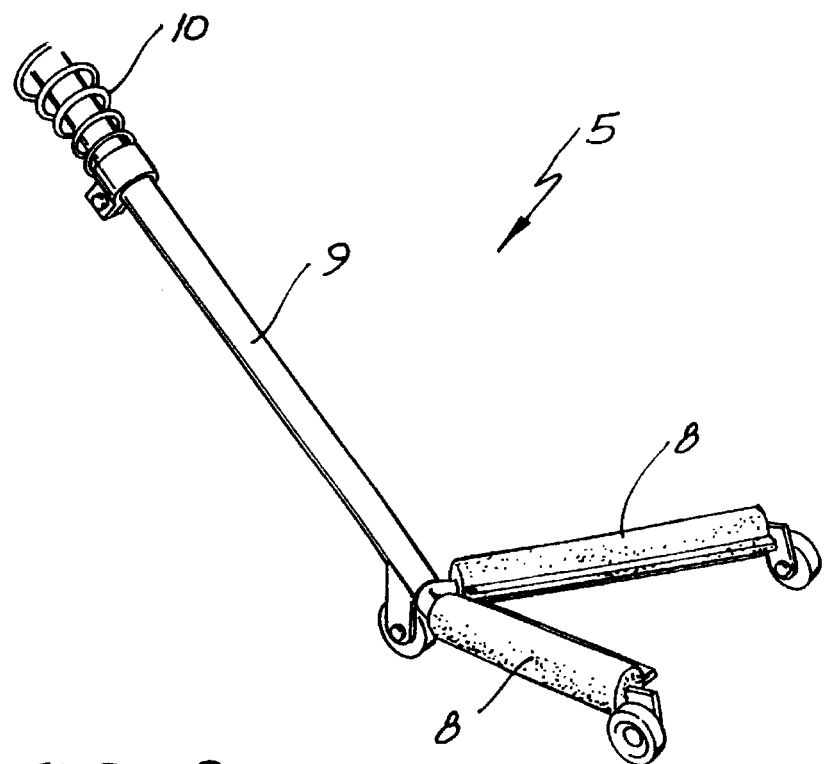
FIG. 8 illustrates how ground contact means may be additionally provided a6 the extremity of each arm.

In use, as illustrated in FIG. 7, as the vehicle travels, moving the distributor over the ground surface, foliage is contacted by the applicator 8 extending from the central support member 9. Any foliage coming into contact with the elongate members 8 has liquid chemical applied thereto. As shown in FIG. 7, this embodiment of a contact chemical distributor is particularly useful where the skid or ground contact means 11 is required to travel in the valleys between two rows of vegetation. The applicator arms 8 preferably extend outwardly, or outwardly and upwardly, from the support member 9 to contact the plants. A useful application of the invention is for chemical application distribution to cotton plants, where fairly rigid plants are planted on raised peaks between troughs.

The provision of flexible connections or spring means between the various components of the device is particularly advantageous in such applications applying chemicals to such rigid foliage.

Figure 9:
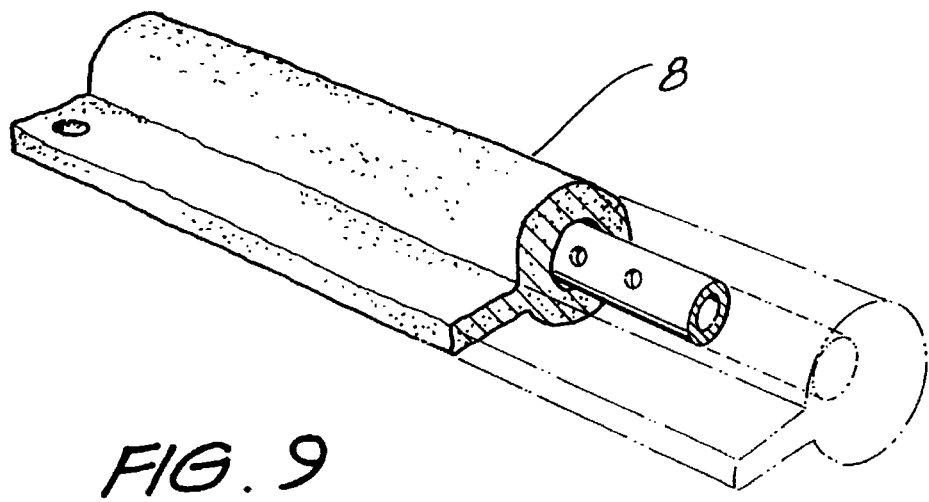
FIG. 9 shows an enlarged view of one arm showing the preferred features thereof.

In FIG. 9 is illustrated the provision of a moisture sensor on each arm 8 of the applicator device. The moisture sensor will sense the amount of liquid chemical on the arm 8 and provide appropriate control or facilitate such that liquid chemical may be supplied via the support shaft to the arms 8 and be emitted via small holes or orifices therein.

It will be appreciated that in use, the position and angular disposition of each arm 8 is preferably variable, in either two or three dimensions, such that the applicator arms can be adjusted depending on the particular physical characteristics of the vegetation to which chemical is to be supplied.

It will be appreciated that such applicator devices may be provided in more than one row, such that after contact by, for instance, a left hand side arm of a forward applicator, the plants or foliage may be contact then by a right hand side arm of an applicator in a secondary row. Obviously, more than two rows may be provided if desired.

It will be appreciated that whilst the embodiment illustrated utilises resilient means between the frame of the structure, the applicators, etc., and skids to glide the applicators along the ground surface, other equivalent or analagous means known to persons skilled in the art may also be provided.

It should also be appreciated that this invention utilises means to ensure that a chemical liquid is always supplied in the applicators. A pumping action, gravity feed system or pressurised chemicals may be utilised to ensure that chemicals are always supplied in the applicators.

It will also be appreciated that a particular advantage of the Applicant's invention is that extremely long width distributors, having a large number of applicators, may be constructed. The width of the distributor device may also be quite simply varied by an operator unlike prior art roller devices.

Whilst particular embodiments have been described and illustrated in the specification hereinbefore, it will be appreciated that numerous variations and modifications will become obvious to persons skilled in the art. Such variations and modifications should however be considered to fall within the spirit and scope of the invention as hereinbefore described.

I claim:

1. A contact chemical applicator for distributing a liquid chemical to at least one foliage and a substrate surface, said contact chemical applicator comprising:

a substantially elongate and downwardly disposed body portion;

ground contact means at a lower end of said body portion to contact said substrate surface as said applicator is moved in a direction of travel; and a pair of applicator arms operatively connected to the body portion and existing above the ground contact means, said arms extending substantially outwardly at opposed angles and transverse to both said body portion and said direction of travel, each said arm contacting and thereby supplying said liquid chemical to at least one of said foliage and said substrate surface.

2. A contact chemical applicator as claimed in claim 1, wherein said arms extend substantially outward at an angle no greater than 180 degrees.

3. A contact chemical applicator as claimed in claim 2, wherein said ground contact means comprises at least one skid.

4. A contact chemical applicator as claimed in claim 3, wherein said body portion is connected to a frame.

5. A contact chemical applicator as claimed in claim 4, wherein a flexible connecting piece is provided along said body portion, intermediate said frame and said ground contact means.

6. A contact chemical applicator as claimed in claim 5, wherein each said applicator arm is connected to said body portion via a flexible connection.

7. A contact chemical applicator as claimed in claim 6, wherein each said arm is variable in angular disposition relative to at least one of the direction of travel and said substrate surface.

8. A contact chemical applicator as claimed in claim 7, wherein a secondary ground contact means is provided at the end of each said arm to provide additional support to said applicator.

9. A contact chemical applicator as claimed in claim 8, wherein said liquid chemical is supplied to each said arm via supply means internal to said body portion.

10. A contact chemical applicator as claimed in claim 9, wherein the rate of supply of said liquid chemical is controlled by a moisture sensing means provided on at least one arm.

11. A chemical distributor comprising a plurality of contact chemical applicators as claimed in claim 10, said applicators being provided in a single row substantially normal to the direction of travel.

12. A chemical distributor comprising a plurality of contact chemical applicators as claimed in claim 10, said applicators being provided in a plurality of rows substantially normal to the direction of travel, applicators in alternate rows being positioned substantially intermediate the applicators in adjacent rows relative to the direction of travel, such that in use, foliage contacted by one of said arms of one of said applicators in a first row is deflected in a substantially opposite sideways direction to that in which said foliage is deflected by one of said arms of one of said applicators in a second row.

13. A chemical distributor, as claimed in claim 12, wherein the applicators in said alternate rows are positioned at different heights from said substrate surface than the applicators in adjacent rows, such that in use, foliage contacted by one of said arms of one of said applicators in a first row is deflected in a vertical direction relative to that in which it is deflected by one of said arms of one of said applicators in a second row.

14. A contact chemical applicator as claimed in claim 2, wherein said ground contact means is at least one wheel.

15. A contact chemical applicator as claimed in claim 1, wherein said ground contact means is at least one skid.

16. A contact chemical applicator as claimed in claim 1, wherein said body portion is connected to a frame.

17. A contact chemical applicator as claimed in claim 1, wherein each said applicator arm is connected to said body portion via a flexible connection.

18. A contact chemical applicator as claimed in claim 1, wherein each said arm is variable in angular disposition relative to at least one of the direction of travel and said substrate surface.

19. A contact chemical applicator as claimed in claim 1, wherein a secondary ground contact means is provided at the end of each said arm to provide additional support to said applicator.

20. A contact chemical applicator as claimed in claim 1, wherein said liquid chemical is supplied to each said arm via supply means internal to said body portion.

21. A chemical distributor comprising a plurality of contact chemical applicators as claimed in claim 1, said plurality of applicators being provided in a single row substantially normal to the direction of travel.

22. A chemical distributor comprising a plurality of contact chemical applicators as claimed in claim 1, said plurality of applicators being provided in a plurality of rows substantially normal to the direction of travel, wherein said applicators in alternate rows are positioned substantially intermediate the applicators in adjacent rows relative to the direction of travel, such that in use, foliage contacted by one of said arms of one of said applicators in a first row is deflected in a substantially opposite sideways directions to that in which said foliage is deflected by one of said arms of one of said applicators in a second row.

23. A contact chemical applicator as claimed in claim 1, wherein said ground contact means is at least one wheel.

* * * * *